Oct. 16, 1951     G. E. CONLISK     2,571,423
INDICATING APPARATUS
Filed April 5, 1948     4 Sheets-Sheet 1

Glen E. Conlisk
INVENTOR.

BY *[signatures]*
Attorneys

Oct. 16, 1951

G. E. CONLISK 2,571,423

INDICATING APPARATUS

Filed April 5, 1948

Glen E. Conlisk
INVENTOR.

BY Thomas A. O'Brien
and Harvey B. Jackson
Attorneys

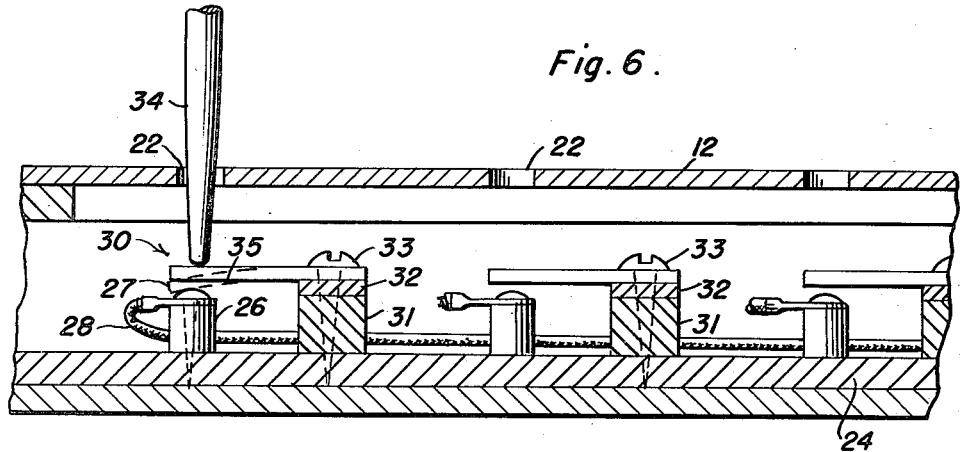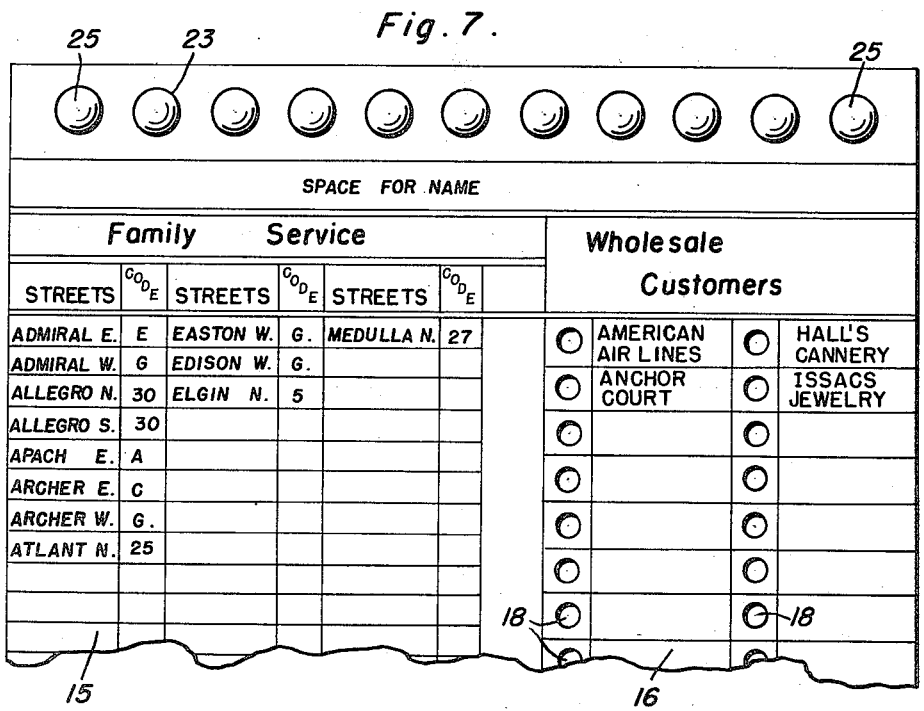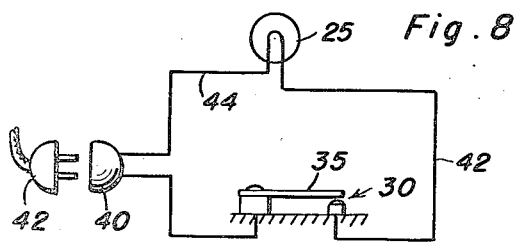

Patented Oct. 16, 1951

2,571,423

UNITED STATES PATENT OFFICE 2,571,423

INDICATING APPARATUS

Glen E. Conlisk, Tulsa, Okla.

Application April 5, 1948, Serial No. 19,006

4 Claims. (Cl. 177—353)

This invention relates to indicating apparatus or devices supplying information, usually merely accessible in tables or booklets, electromechanically and it has for its general object to indicate the allotment to a main division of a system of some kind, of the independent units, sub-units and subdivisions of which the system consists.

More particularly the invention relates to electro-mechanical means for supplying information about the subdivisions of a system which consists of units which are easily identifiable by their name or other identification means, and of sub-units and subdivisions of the same which are only identifiable as parts of the units and which nevertheless form within the system independent elements, assignable to any of the main divisions of the system.

It is a further object of the invention to provide means for the purpose set forth which are easy to handle and which furnish reliable results and permit to avoid the making of mistakes in connection with the location of the main divisions of a system to which a unit may belong.

It is more particularly the object of the invention to provide electromechanical indicating means for the automatic indication of the main division of a system to which an element or unit belongs, even if this element or this unit can only be identified as part of a sub-unit or of a subdivision thereof.

It is a still further object of the invention to provide contact means for each element or unit, the main division of which has to be identified which are so arranged that the contacts of the sub-units and subdivisions of the main division are readily identifiable, this being obtained by arrangement of the contacts in aligned columns and/or in aligned rows and by the use of tables, indicating the number or position of said column or row.

It is a further, more specific object of the invention to provide hand operated contact means on a board for each element to be identified, with all the contacts, allotted to elements belonging to one and the same main division, being connected in parallel and connected with a circuit which also includes a division indicating lamp and a connection with a source of current, thus permitting the operator, by closing one contact, to light the lamp indicating the main division to which an element belongs.

It is a further and more specific object of the invention to use said system for the automatic indication of the zones or routes to which the blocks of a city belong when the latter are identifiable by a reference to the street, to that part of it which runs in a definite direction and finally by the number assigned to it on said part of the street.

It is a further and more specific object of the invention to provide simultaneously means for identifying the zone or route of a street or of a place or of a customer the full address of which is supplied and means for identifying a block of a city by reference to the street name, the direction in which it runs and the number of the block in this direction.

Still further and more specific objects will be apparent from the following specification.

One embodiment of the invention has been illustrated by way of example. But it is to be understood that this example is not limitative neither as regards construction nor as regards application and that it has been selected in order to be able to explain the invention and one of the preferred modes in which it is contemplated applying its principle in a special case. This example will provide the expert skilled in the art with sufficient information to enable him to adapt or modify the principle of the invention to other applications or to other constructive requirements. Modifications of the example shown are therefore not necessarily departures from the invention.

In the drawings:

Figure 5 is a plan view of a portion of the operator's board or front of the apparatus.

Figure 6 is a fragmentary sectional elevational side view of the apparatus on an enlarged scale, the section being taken along line 6—6 of Figure 1.

Figure 7 is another fragmentary plan view of the upper portion of the operator's board.

Figure 8 is a simplified diagram of connections.

Figure 1:
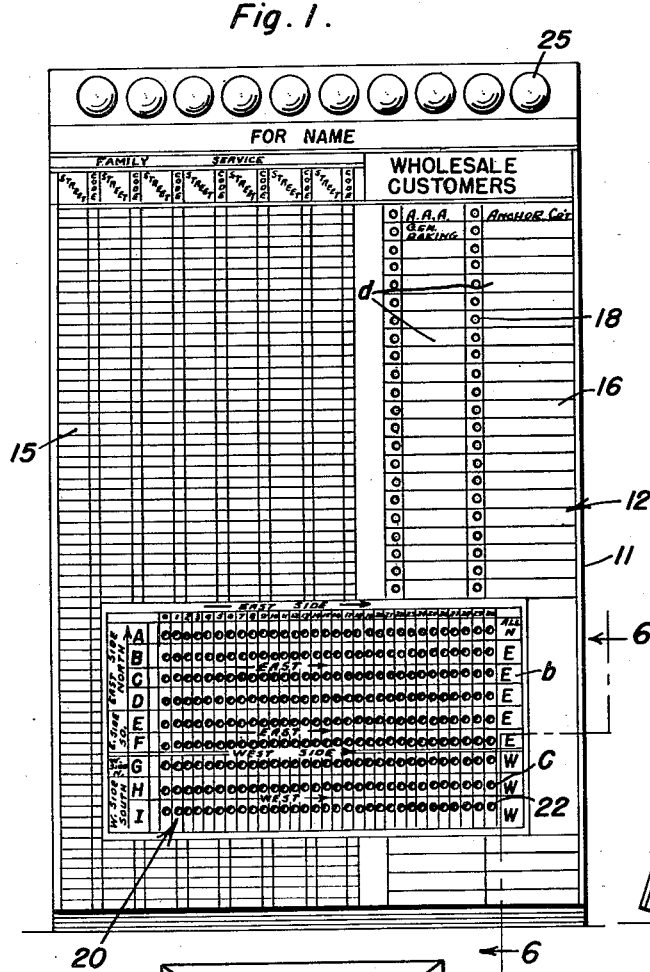
Figure 1 is an elevational front view of the apparatus.
Figure 2:
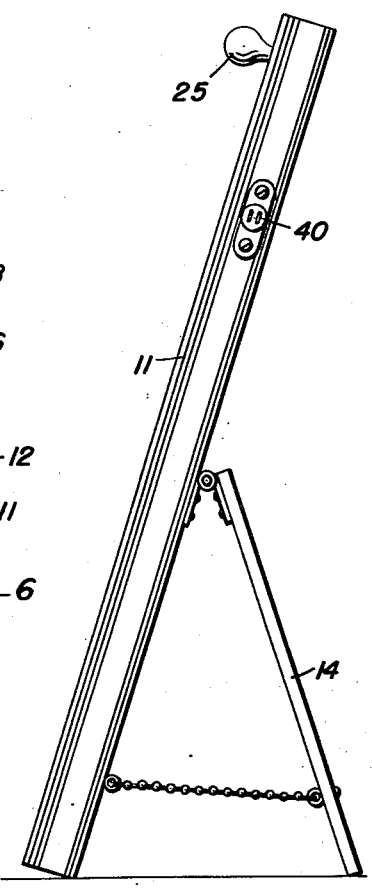
Figure 2 is an elevational side view.
Figure 3:
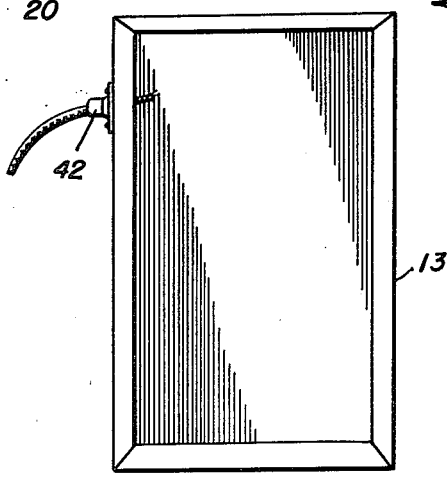
Figure 3 is an elevational rear view of the spacer sheet.

The problem to be solved by the indicator according to the invention consists in finding for each one of a large number of items, of locations or the like, the group, class, district, zone or route to which it belongs or to which it has been assigned or allotted by the adoption of a system. It will be clear, therefore, that the apparatus may be used for educational or scientific purposes, or as a guide for locating stations in transportation systems or departments, individual offices or the like within an organization, occupying a plurality of buildings, floors or the like. However in the following specification an industrial application is described. It is assumed that the blocks of a large city have been assigned to certain routes or zones to be serviced from certain points by an organization.

This problem of locating a city block is more involved, as will be readily understood, than the problem of locating a large establishment or a street on a map, or within a zone system, because the blocks of a single street are as a rule assigned to different zones or routes, according to available traffic lanes and according to their position with respect to the servicing centers.

Usually in actual practice the above mentioned two problems have to be treated simultaneously by the indicator, which must furnish a rapid and reliable indication of the zone or route, if certain basic data are furnished. The rapidity with which it is operable and the reliability with which it works exceeds by far that of an operator using tables, lists, books, index cards and the like.

It almost completely eliminates mistakes which entail a disproportionate amount of labor and costs and which cause dislocation and retardation of the service.

The apparatus, described as an example, is an indicator in which the routes or zones to which city blocks on the one hand and a limited number of individual parties, customers, streets or places, on the other hand have been allotted or assigned, may be located.

This apparatus comprises a casing 11 which may be fixed on the wall or may be provided with legs 14 to make it stand up in an approximately vertical position. The casing carries an operator's board 12 on top and a contact board 24 underneath. An intermediate spacing board 13 may be arranged between these two boards 12, 24, which, however fulfills merely the purpose of holding said boards at the required distance. The operator's board comprises a reference table 15 which in the present case contains the street names and besides a reference character for the subdivision of the street.

Such subdivisions are in most cases necessary because the street name and the block number do not furnish a complete indication of the location but have to be supplemented by the orientational indications North, South, East and West or similar indications.

A second table 16 on the operator's board is provided for those customers, establishments, streets or places which may be located directly. A list of wholesale customers whose names are indicative of their locations is given as an example in this table. Near each name a means for producing a contact on the contact board is located. This means may for instance consist in a push button or the like. But in the example shown a hole 18 aligned with the customer's name is provided, through which, by inserting a stylus, a pencil or the like, the operator has access to a single contact on the contact board underneath and may operate this contact.

The third table 20 of the operator's board is an operating table and contains a number of columns provided with the contact making devices, again shown in the form of holes 22 through each of which the operator has access to a single contact on the contact board below. Thirty columns have been indicated which correspond to thirty blocks. As a rule there is one block number beyond which it is unnecessary to go, because all the blocks beyond said number are serviced in the same way. It is assumed that this block is block No. 30.

The rows b, c in the table formed by corresponding holes in all the columns are indicated by the reference characters (A to I in the table shown) and by block numbers (such as 1500–1300). The latter numbers indicate the blocks on numbered streets or on streets having a number as their reference character. It is customary in many cities to use a system of naming or numbering streets which is indicative of the main direction in which the street runs. However, where no such system is used, it is preferable to use a color scheme in the tables of the apparatus and to use for instance a certain color in table 20 for all the rows b indicating the East side (A to F) and another color for the rows c allotted to the West side (rows G to I). The street names in table 15 in such a case are printed on a background of identical color so that no additional reference character need be employed.

In its upper portion the operator's board comprises a number of large holes 23 through which the bulbs 25 of the route indicating lamps may project.

The contact board 24 comprises a pair of contacts 30 for each hole 18 or 22, located directly beneath said hole. Each pair of contacts may consist as shown in Figure 6 of a post of insulating material 26 carrying a terminal screw 27 connected with a wire 28, and of a further post 31 carrying a bar 32 running from post to post and of a contact spring 35 held on said bar by means of a screw 33. The spring projects from the post 31 and its end is directly above terminal screw 27, the latter being arranged beneath each hole 22 or 18. When a stylus 34 is therefore inserted into the hole 22 and is moved downwardly the spring 35 is pressed downwardly and comes into contact with contact post 27, thereby closing a circuit as shown in Figure 8 and as further described below, which includes one of the zone or route indicating lamps 25.

It has been mentioned that a pair of contacts consisting of post 27 and spring 35 is arranged below each hole 22 and 18. Columns 18' of contacts 30 are therefore arranged below the holes 18 of columns d adjacent each name in table 16 and rows 22' are arranged below the row of holes 22 in rows b and c of table 20.

All the contact springs 35 of a column 18' and of a row 22' are connected by the bar 32 and all the bars 32 are connected to the bus bar 36. A connection of the bus bar 36 with the bars 32' of the columns 18' may be made of a contact piece 37.

The bus bar 36 is connected with wire 39 leading to a socket contact 40. This socket contact is connected with any suitable source of current by means of the plug and cord 42.

The upper portion of the contact board is provided with a number of lamp sockets, into which the zone or route indicating lamps 25 are inserted. Each of the lamp bulbs corresponds to one of said zones or routes. The bulbs project through openings in the operator's board 12, and the lighting of a bulb upon depressing of a contact through one of the holes in the operator's board indicates the number of the zone or route to which the hole has been allotted.

Figure 4:
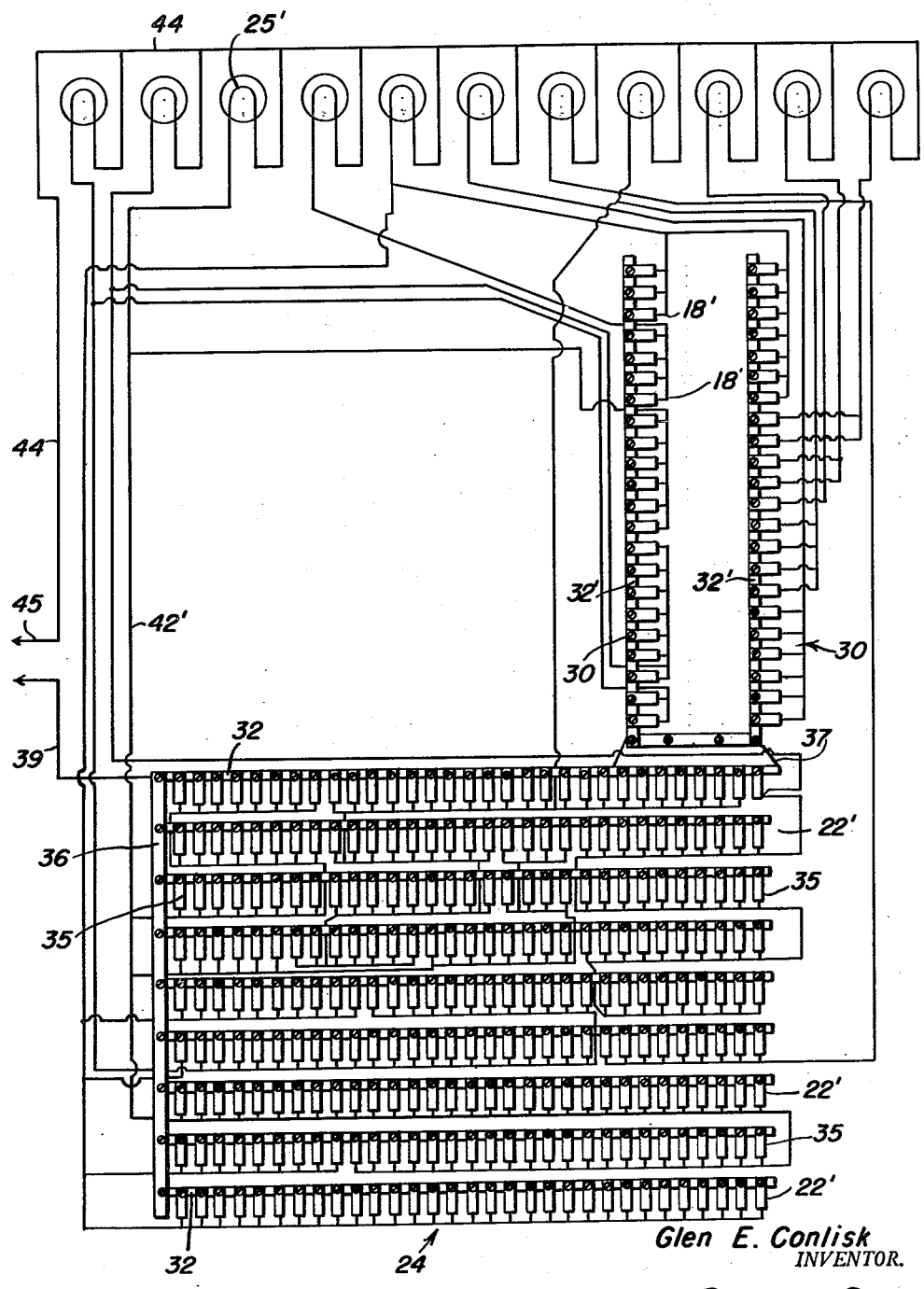
Figure 4 is a plan view of the contact board of the apparatus showing the electrical connections.

The individual contacts 27 of each row are connected with each other by wires in a way which corresponds to their allocation or allotment to the zones or routes. It will thus be seen, for instance, that the first eight contacts on the right in Figure 4 in the first row are connected with the first eight contacts in the second and third row thus indicating that in first to eighth streets the block numbers 200–1500 and in all the cross streets indicated by reference characters A—C the blocks 1–8 are in the same zone. The wire 42' which runs from these connected contacts 27 allotted to the same zone or route is connected with the zone or route indicating lamp socket 25'. From there a common conductor 44 runs to the socket 40 which is connected with the mains or some other source of current.

To provide an example let it first be assumed that 2609 East Admiral Street calls for service. The operator ascertains the reference character of Admiral East which is E, he then inserts his stylus in the 26th hole of row E thus closing the circuit of the second bulb 25 from the left in Figure 4 indicating that this block is on Route 2. The operator notifies the service center of Route 2 accordingly.

Let it be assumed that No. 1480 on 30th Street South or on Allegro Street calls. The operator gets the number 30 when referring to table 15 and proceeds in the thirtieth column to the number of the block which is between 1300 and 1500. Therefore he inserts his stylus in the topmost row of column 30 again lighting the second bulb 25 from the right, showing that this block is in Route 2.

The operator proceeds in a similar manner if the call comes from one of the wholesale customers, listed in table 16, receiving a direct indication of the route on which the customer is located.

It will thus be seen that the operator's activity reduces itself to the proper use of a single table or to the use of two tables, one of them furnishing the indications of the plainly marked line or row to be selected on the other table. The data used are of such a nature that errors will be most infrequent.

It will be obvious that the present example may be applied to modified uses and that the unessential details may undergo changes without in any way affecting the essence of the invention.

Having described the invention, what is claimed as new is:

1. An indicating system for identifying units, originally identified within a basic reference system by means of a large number of identification data and using tables, tabulating groups of data and key indicia for arranging the large number of data into groups, said identification being made within a second arbitrarily selected system using a smaller number of identifying data for said units to which each of said units is allotted, said system comprising an operator's board, a group of contact pairs with closable contacts arranged along parallel lines crossing each other, each contact pair arranged along one line being allotted to one of the groups of data of the basic reference system and each of these lines being provided with an identifying mark on said board corresponding to the said groups of data, each line of contact pairs crossing the aforesaid lines being likewise provided with a mark, corresponding to another group of identification data of the basic reference system, group connections between single contacts of each contact pair, joining contacts of all contact pairs assigned to the same division of the second arbitrarily selected system, a separate operative circuit joined to each of said group connections, a number of indicator signals on the operator's board corresponding to the number of divisions in the second arbitrarily selected system, each indicator signal being connected with one of said operative circuits, a common connection for all operative circuits, a source of currents, connected with said common connection, and a further common connection joining all the second contacts of the contact pairs not joined to the group connections, said further common connection being operatively connected with the source of current.

2. An indicating system for identifying units, originally identified within a basic reference system by means of a large number of identification data and using tables, tabulating groups of data and key indicia for arranging the large number of data into groups, said identification being made within a second arbitrarily selected system using a smaller number of identifying data for said units to which of said units is allotted, said system comprising an operator's board, a group of contact pairs with closable contacts arranged along crossing lines, a second group of contact pairs with closable contacts arranged along crossing lines, one set of lines in the two groups being coincident with lines of the other group, the set of lines crossing the aforesaid lines and containing the contacts of one group of contact pairs being parallel with the crossing lines containing the contacts of the other group of contact pairs, identifying marks for each of the coincident lines of the two groups corresponding to one of the groups of unit identifying data of the basic reference system, identifying marks associated with each of the crossing lines allotted to the aforesaid two groups of contact pairs, said identifying marks corresponding to the key indicia connecting conductors joining the single contacts of all contact pairs assigned to the same division of the second arbitrarily selected system, a separate operative circuit joined to each of said group connecting conductors, a number of indicator signals on the operator's board corresponding to the number of divisions in the second system, each indicator signal being connected with one of the said operative circuits, a common connection for all operative circuits, a source of current, connected with said common connection for all operative circuits, and a further common connection joining all the other contacts of the contact pairs not joined to the group connecting conductors, the last named connection being operatively connected with the source of current.

3. An indicating system of the type set forth as claimed in claim 1, said device comprising in addition a group of contact pairs on the operator's board arranged along a single line, each of said contact pairs being completely identified in the basic reference system, one contact of each pair being joined to the circuit of the division of the second system to which the completely identified contact pair belongs, the other contacts of the pair being joined to the common connection between all contacts of all contact pairs leading to the source of current.

4. An indicating system for identifying units, originally identified within a basic reference system by means of a large number of identification data and using tables, tabulating groups of data and key indicia for arranging the large number of data into groups, said identification being made within a second arbitrarily selected system using a smaller number of identifying data for said units to which of said units is allotted, said system comprising an operator's board, including a baseboard and a top board, the latter arranged at some distance atop of the baseboard, the baseboard being provided with groups of closable contact pairs, each contact pair including a fixed contact marked on the baseboard and resilient contacts located atop of the fixed contact and being depressable, said top board being provided with a hole atop of each contact pair for operational closing of said two contacts of the pair by the operator by means of a tool inserted in the hole, said contact pairs being arranged along sets of parallel lines crossing each other, each contact pair arranged along one line being provided with an identifying mark on said board, each line of contact pairs crossing the aforesaid lines being likewise provided with a mark, the first named mark referring to one group of basic identifying indicia in the basic reference system, the last named mark, corresponding to the key indicia, group connecting conductors between single contacts of each contact pair joining contacts of all contact pairs assigned to the same division of the second arbitrarily selected system, a separate operative circuit joined to each of said group connecting conductors, a number of indicator signals on the operator's board corresponding to the number of divisions in the second arbitrarily selected system, each indicator signal being connected with one of the said operative circuits, a common connection for all operative circuits, a source of current, connected with said common connection for all operative circuits, and a further common connection joining all the other contacts of the contact pairs not joined to the group connecting conductors the last named connection being operatively connected with the source of current.

GLEN E. CONLISK.

REFERENCES CITED

The following references are of record in the file of this patent:

UNITED STATES PATENTS

| Number | Name | Date |
|---|---|---|
| 926,386 | Chappell | June 29, 1909 |
| 1,637,685 | Cowles | Aug. 2, 1927 |
| 1,737,520 | Richardson | Nov. 26, 1929 |
| 1,780,711 | Lichter | Nov. 4, 1930 |
| 1,795,536 | Baker | May 10, 1931 |
| 1,867,048 | Abel | July 12, 1932 |
| 2,204,315 | Levin | June 11, 1940 |
| 2,313,560 | Levine | Mar. 9, 1943 |